United States Patent
Flogel

[15] 3,669,270
[45] June 13, 1972

[54] WATER SOFTENER AND A DEVICE COMBINED THEREWITH

[72] Inventor: Ernst Flogel, Niederscheld, Germany

[73] Assignee: Francksche Eisenwerke AG, Adolfshutte, Niederscheld (Dillkreis), Germany

[22] Filed: Jan. 21, 1970

[21] Appl. No.: 4,511

[30] Foreign Application Priority Data

Jan. 24, 1969 Germany......................P 19 03 492.5
Jan. 27, 1969 Germany......................P 19 03 833.6

[52] U.S. Cl..............................210/123, 210/134, 210/258, 210/275
[51] Int. Cl........................................................B01d 23/10
[58] Field of Search...............210/30, 34, 35, 190, 191, 275, 210/279, 123, 134, 135

[56] References Cited

UNITED STATES PATENTS

| | | |
|---|---|---|
| 2,076,321 | 4/1937 | Pick....................................210/275 X |
| 1,195,391 | 8/1916 | Newman.............................210/275 X |
| 3,148,687 | 9/1964 | Dosch................................210/191 X |
| 1,749,422 | 3/1930 | Eisenhauer...........................210/191 |
| 2,767,139 | 10/1956 | Hagman.............................210/191 X |
| 3,374,891 | 3/1968 | Buchmann.........................210/191 X |
| 3,516,930 | 6/1970 | Ross....................................210/34 X |

Primary Examiner—Samih N. Zaharna
Attorney—Irving M. Weiner

[57] ABSTRACT

Apparatus for softening water including a tank which is filled with an ion exchange composition and which is open at its upper portion. The tank includes an inlet pipe, an outlet pipe and a valve for controlling the flow at the inlet pipe to maintain a constant level of liquid in the tank. A backwash pipe is connected between a branch on the inlet pipe and a branch of the outlet pipe. A drain cock is provided at the lower portion of the tank.

1 Claim, 6 Drawing Figures

Inventor:
ERNST FLOGEL
BY Irving M. Weiner
ATTORNEY

WATER SOFTENER AND A DEVICE COMBINED THEREWITH

The invention relates to an apparatus for softening water, and particularly relates to a water softener consisting of a vessel which is open at the top and partly filled with an ion exchange composition.

BACKGROUND OF THE INVENTION.

Water softeners are mainly used for softening tap water which is taken from water mains and which contains calcareous substances. These substances form undesirable depositions in systems using water or on surfaces which have been treated with this water.

For the purpose of softening water, use is generally made of an ion exchange process in which hard, calcareous water is passed through a granular ion exchange composition.

Appliances working by this method and having the form of closed vessels are usually under pipe pressure, as disclosed by Swiss Pat. No. 456,070, German Patents Nos. 461,537 and 394,535, and German Published Application No. 1,225,569.

Appliances of this kind are expensive because they must be provided with walls of suitable thickness for withstanding maximum pipe pressures. In addition, the construction of their lids is complicated and accordingly expensive to manufacture, because in order to permit the introduction of common salt as a regenerating agent for the ion exchange composition, the lid must be constructed so that it can be removed and replaced again and still make a pressure-tight seal.

In order to overcome this problem, a salt solution is introduced as a liquid regeneration agent into closed vessels, i.e., vessels not equipped with detachable lids. For this purpose, however, a separate container is required to produce a regenerating solution of this kind, as well as a connecting pipe system between the regenerating agent container and the softener vessel, together with corresponding shut-off valves, such as disclosed by Swiss Patent No. 456,070. Thus, the advantage gained by dispensing with a lid equipped with a special seal entails the disadvantage of requiring a second vessel. Moreover, with an appliance of this type the replacement of the ion exchange composition is complicated.

Finally, a simple water softening appliance working without pressure is known from German Patent No. 530,622. This is a can-shaped container which is open at the top. This container is provided with a vertical partition which extends from the region of the free top edges of the container in the direction of the bottom of the latter, without reaching to the bottom. Two communicating containers are thus formed, one of which receives the ion exchange composition. The tap water introduced flows through the ion exchange composition, and softened water can be withdrawn by tipping the can-shaped container. If tap water is poured into the outlet channel, tipping in the opposite direction permits flow through the ion exchange composition oppositely to the working direction, whereby said composition is washed. For the purpose of regeneration, common salt is simply added at the top.

The present invention is based on an appliance which works in this simple manner without pressure and which is also simple in construction and operation.

Disadvantages of the known can-shaped hand appliance reside in the fact that it is suitable only for small quantities, that continuous withdrawal of water is not possible, and that handling is too complicated. The known hand appliance can also not be connected to a system consuming water.

The problem underlying the invention accordingly consists in providing a water softener of the type mentioned, which is of correspondingly simple construction and can be manufactured and operated economically and which works with continuous flow, as is known in the case of closed vessels, so that it can be connected to systems using water.

The new water softener should in addition be able to operate continuously, i.e., without intermediate regeneration, so as to soften the amount of water required per day by a water-consuming system connected to it.

In addition, backwashing and regeneration should require only slight, simple intervention.

SUMMARY OF THE INVENTION.

The present invention provides an apparatus for softening water including a tank which is filled at least partially with an ion exchange composition and which may be open at or near its upper portion. The tank is provided with inlet means, outlet means, and control means so that with a continuous flow through the tank a constant level of liquid is maintained in the tank. The inlet means includes a branch having a backwash pipe adapted to be closed by a valve. Drain means is operatively connected to and disposed at or near the lower portion of the tank.

According to the invention, there is also provided a vessel equipped with inlet and outlet pipes and provided on the inlet side with a controller, so that while flow through the apparatus is continuous a constant level of water is ensured by equal amounts of incoming and outgoing water, a backwash pipe adapted to be closed by a valve branching off from the inlet pipe, and a drain cock being disposed beneath the bottom of the vessel.

Water softeners of this type are frequently connected to appliances consuming water, such as washing and dish-washing machines, motor vehicle washing appliances, and steam boilers.

Apart from the better washing effect achieved when softened water is used, the protection of the appliances in question through the avoidance of harmful calcareous depositions, which are particularly critical in appliances heating water, is of great importance because the life of these appliances and the intervals between servicing are considerably lengthened.

Water softeners and appliances using and possibly heating softened water are usually connected by relatively long pipes, even when water softeners are incorporated in the casing of such appliances. Alternatively, since these are closed water softener fittings working under pipe pressure, lengthy backwash pipes are provided which run from a separate regenerating agent container, likewise accommodated in the appliance, to the water softener. The disadvantage is that appliances of this type are relatively large, and thus take up considerable space. If water softeners are disposed separately from the appliances using the water, the problems space are moreover intensified by the connecting pipes required which are often relatively long. It is therefore desirable to make the connection between the water softeners and the appliances using the water as compact as possible.

This problem is advantageously solved with a water softener according to the present invention in conjunction with a washing machine. The tank containing the ion exchange composition is accommodated together with a washing solution tank in a common cashing, one side wall of the tank containing the ion exchange composition being at the same time a side wall of the washing solution tank, and the two tanks being connected by an overflow pipe lying beneath the casing.

In another embodiment of the invention, the casing is subdivided by a partition into a water softener tank and a washing solution tank.

As the result of a construction of this kind, the two tanks required lie directly side by side, so that a washing machine together with a water softener of compact construction is formed in a very small space.

A compact washing machine of this kind which works exclusively with softened water, including that used for preparing the concentrated washing solution which is further diluted with softened water, can be used as a self-contained unit in other appliances which are likewise of compact construction. For example, a steam jet appliance may be formed which is of compact construction and consists of two casing parts. An additional advantage is that harmful calcareous depositions cannot occur in the heating coil which is heated in the combustion chamber of the appliance and through which water flows, since the water used is softened water.

The water softener can at the same time conveniently be so designed that its ion exchange composition becomes exhausted and requires regeneration only after the amount of water required for daily consumption has passed through it. Given suitable tank capacity, consistency and corresponding proportioning of the concentrated washing solution, the amount of the latter which is contained in the washing solution tank and is to be mixed with the softened water can likewise correspond to daily consumption requirements, so that interruptions in operation are avoided.

DETAILED DESCRIPTION OF SEVERAL EMBODIMENTS OF THE INVENTION.

Figure 1:
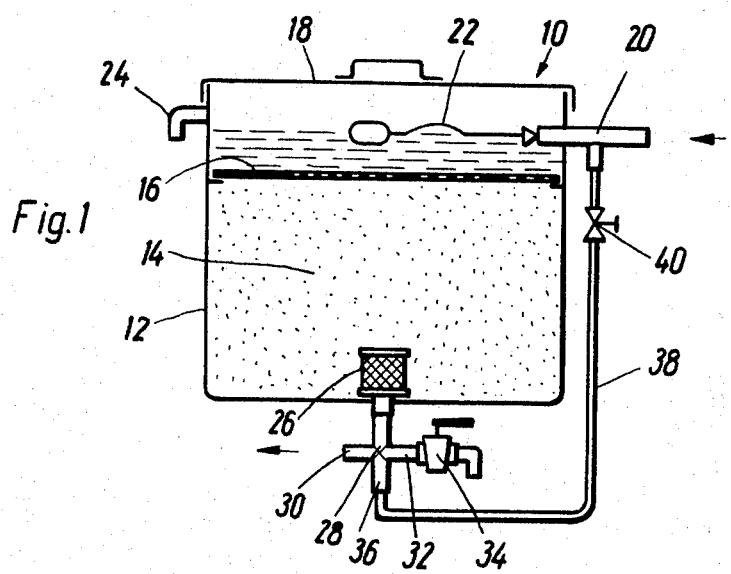
FIG. 1 shows a first embodiment of a water softener working without pressure.

FIG. 1 illustrates a first embodiment of the invention wherein a water softener 10 consists essentially of a tank 12 which is open at the top and which contains and at least partially filled with a granular ion exchange composition 14 through which the water to be softened flows. Inlet and outlet pipes 20 and 28, respectively, are disposed mainly outside the tank 12. The ion exchange composition 14 is covered by a filter 16, the perforations of which are selected so that grains of the ion exchange composition 14 cannot pass through.

The tank 12 may be closed by a removable lid 18, in order to prevent the penetration of dust or the like. Since the water softener 10 works without pressure and the lid 18 is therefore not required for its operation, no seal is required between the tank 12 and the lid 18, if the latter is provided.

The water to be treated enters through the inlet pipe 20. In the region of the opening or outlet of the pipe 20 there is disposed a control means 22, for example a float valve, which prevents the entry of water when a level corresponding to the inlet height of the inlet pipe 20 is reached. The level of water in the tank 12 is kept constant by the control means 22.

On the opposite side of the tank 12 to that where the inlet pipe 20 enters, an overflow pipe 24 is situated above the level of water maintained during operation and projects out of the tank 12.

On the bottom of the tank 12, within the ion exchange composition 14, there is disposed a filter 26 protecting the opening of an outlet pipe 28, in order to prevent grains of the ion exchange composition 14 from passing out. A branch 30 of the outlet pipe 28 leads to a water-consuming appliance (not shown). A drain cock 34 is provided on a second branch 32. A third branch 36 leads into a pipe 38 which leads into the inlet pipe 20 with the interposition of a shut-off valve 40.

Figure 2:
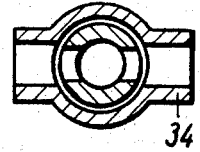
FIGS. 2 and 3 are cross-sections through the drain cock of the water softener shown in FIG. 1, in different adjustment ranges.

In addition to the closed position, the drain cock 34 can be moved to a position freeing the entire passage cross-section or to a position considerably narrowing this cross-section. FIG. 2 illustrates the free passage position, and FIG. 3 the position in which the cross-section is considerably reduced. Stops or external markings are advantageously provided for these adjustments.

During the operation of the water softener 10, the tap water flows into the tank 12 through the inlet pipe 20. The water passes through the ion exchange composition 14, which is enclosed between the two filters 16 and 26 by the walls of the tank, and softened water leaves the tank 12 through the filter 26 and the outlet pipe 28. Through the branch 30 it flows without pressure to a water-consuming appliance.

When the water to be softened enters, it first flows more quickly to the tank 12 than it can pass out after trickling through the ion exchange composition. When a water level corresponding to the height of the inlet pipe 20 has been reached, the control means 22 shuts off the flow. When the level of water falls through the withdrawal of water, the control means 22 opens again so that a substantially constant level of water is maintained in the tank 12, the amounts flowing out and flowing in corresponding to one another.

The tank 12 is lower in height in comparison with its cross-sectional area than is the case with known water softeners, since in practical operation it has been found advantageous to keep the inlet cross-section leading to the ion exchange composition 14 as large as possible, in order to utilize the entire ion exchange composition 14 uniformly.

According to the invention, this inlet cross-section may correspond to the entire cross-sectional area of the tank 12 and thus to the entire surface of the ion exchange composition, so that the same trickle conditions prevail in all parts of said composition. Flow through the ion exchange composition is thus of uniform intensity, and optimum utilization of said composition is consequently achieved.

The ion exchange grains are regenerated in known manner by loosening the composition by backwashing, followed by impregnation with a solution of common salt.

For the purpose of backwashing and consequently loosening the ion exchange composition 14, the shut-off valve 40 is opened for a short time, so that tap water flows through the composition 14 from bottom to top, i.e., opposite to the working direction. Excess water passes out of the tank 12 through the overflow pipe 24.

For the regeneration of the consumed ion exchange composition 14, a predetermined amount of common salt is simply scattered over the surface of the filter 16 after the lid 18 has been opened, this salt dissolving in the water contained there. With the water-consuming appliance switched off and the valve 40 closed, the drain cock 34 is opened so that the salt solution passes through the filter composition and flows off through the drain cock 34. A similar amount of fresh water flows in and continually forms new salt solutions until all the salt has been dissolved. The drain cock 34 continues to remain open and the filter composition is washed clear by the fresh water which then flows through.

Figure 3:
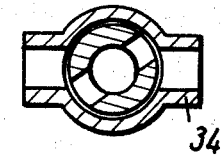

It has been found advantageous to design the capacity of the water softener so that the ion exchange composition will be exhausted and require regeneration only after the amount of water required for daily use has passed through. In this case the regeneration is effected overnight. For this purpose the plug of the drain cock 34 is moved into a position in which the cross-section is greatly reduced, as illustrated in FIG. 3, so that the amount of water required for regeneration and backwashing flows through the tank in 14 to 16 hours.

Figure 4:
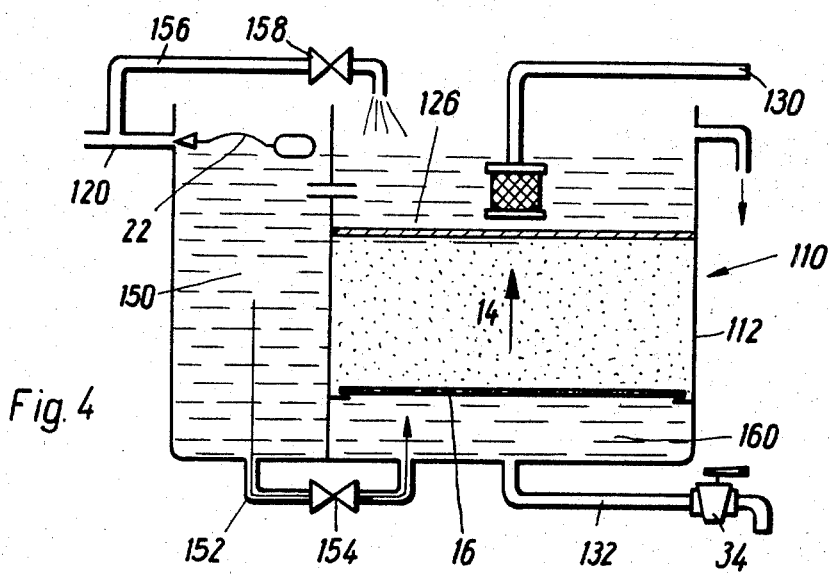
FIG. 4 shows a second embodiment of a water softener working without pressure and provided with a lateral inlet tank.

FIG. 4 illustrates a water softener 110 as an alternative form of construction to that illustrated in FIG. 1. Where the constructional elements of the water softener 110 are identical with those of the water softener 10, they are indicated by the same reference numerals. Where functional equivalents exist, the reference numerals correspond to those in FIG. 1 preceded by a "1". Constructional elements of the water softener 110 which do not occur in the water softener 10 have three-place reference numerals in which the last two places of the references used in FIG. 1 do not occur.

Only these items which are not contained in FIG. 1 will be described below.

The water softener 110 works with a flow in the opposite direction to that of the water softener 10, i.e., from bottom to top.

The tank 112, corresponding to the tank 12 in FIG. 1, is preceded by an inlet tank 150. The tanks 112 and 150 are connected by an overflow pipe 152 which contains a shut-off valve 154. The softened water is drawn off by suction through a pipe 130. For this purpose a water-consuming appliance (not shown) is equipped with a pump.

The washing or backwashing of the ion exchange composition 14 is effected through a washing pipe 156 which has its mouth above the tank 112 and which branches off from the inlet pipe 120 and is provided with a shut-off valve 158 upstream of its outlet.

The first filter 16 (referred to the working direction) is situated at the bottom of the water softener 110 because the direction of flow is reversed. A plate filter 126 corresponding to the basket-like filter 26 lies in the position opposite to that previously occupied by the filter 16. During operation, the shut-off valve 154 is opened and the incoming water flows from the inlet tank 150 into a filter antechamber 160, and then rises in the tank 112 in accordance with the level in the inlet tank 150.

For the purpose of regeneration and filling, the valve 154 is closed and the valve 158 opened. Since the inlet tank 150 is full, the control means 22 closes, and water then continues to enter the tank 112 through the washing pipe 156. With the drain cock 34 open, the washing water flows out through the outlet pipe 132. The other observations made in connection with FIGS. 1, 2 and 3 are appropriately applicable.

Since in certain circumstances the flow through the ion exchange composition 14 from bottom to top may proceed more slowly than the flow from top to bottom, it is possible with a rising direction of flow to effect more intensive softening of water from case to case. Both alternative constructions are therefore included in the invention.

Figure 5:
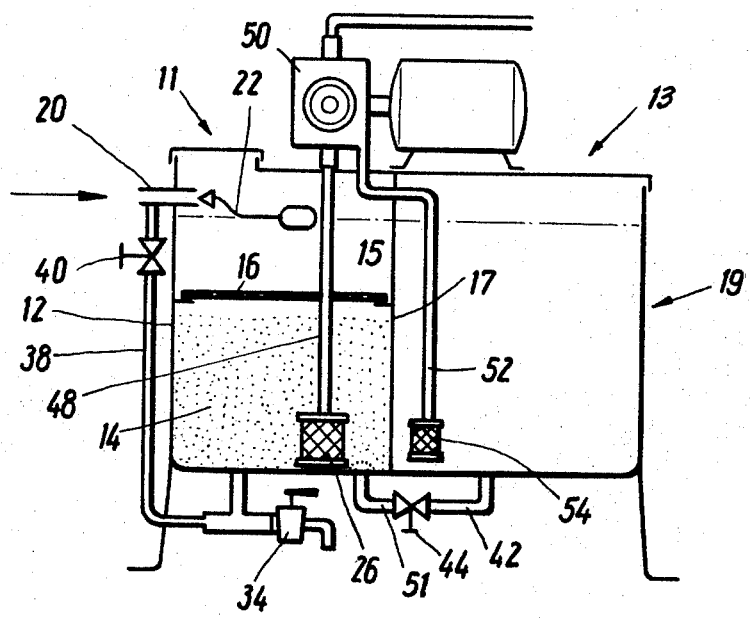
FIG. 5 shows a third embodiment of a water softener combined with a washing solution mixer to form a washing machine.

A combined washing machine according to FIG. 5 consists of a water softener 11 and a washing solution mixer 13. The water softener 11 and the washing solution mixer are accommodated in a common tank casing system 15 which is subdivided by a partition 17 into a first tank 12 for the water softener 11 and a second tank 19 for the washing solution mixer 13.

The water softener 11 corresponds substantially to the softener illustrated in greater detail in FIG. 1.

The tank 12 is in communication at the bottom with the tank 19 by way of pipe 42. The pipe 42 contains a shut-off valve 44 which may also be constructed as or combined with a non-return valve.

The tanks 12 and 19 can be connected together by pipes 51 and 42 which can be closed by a valve 44. In this manner, it is possible to selectively introduce drain softened water or solvent of ion exchange composition into the tank 19 in order to prepare a washing solution in the latter.

At the base of the tank 12 there is provided, at the bottom of the ion exchange composition, a filter basket 26 into which a suction pipe 48 of a pump 50 leads. A second suction pipe 52 of a pump 50, provided with a suction basket 54, penetrates into the tank 19 as far as the base region of the latter.

The mixing of the water drawn in by suction and of the softened water is effected by means of a suitable device in the pump 50.

During the operation of the pump 50, the latter draws varying amounts of liquid out of the tanks 12 and 19, the amount taken from the tank 12 always being greater than that taken from the tank 19. The relatively highly concentrated washing solution in the tank 19 is thereby mixed with the softened water from the tank 12 and is available under pump pressure in the mixture ratio adjusted in each particular case, for example, for cleaning motor vehicles and the like.

The water softener 11 produces softened water continuously, while hard tap water flows in to replace the amount of softened water drawn off, so that the water level in the tank 12 remains constant.

It is convenient to give the washing solution mixer dimensions adequate to contain the amount of washing solution required for 1 day's use. It is likewise advantageous for the amount of ion exchange composition 14 to be such that it likewise does not require regeneration during the usual daily period. In this case, regeneration and the preparation of fresh washing solution can take place overnight.

In order to prevent washing solution from passing out of the tank 19 into the tank 12 in certain circumstances, the shut-off valve 44 may be designed as or combined with a non-return valve.

Regeneration and back washing of the ion exchange composition 14 are effected in the manner described above.

This particularly advantageous combination of a water softener with a washing solution mixer to form a washing machine 10 working solely with softened water may conveniently also be used as a component of other machines.

Figure 6:
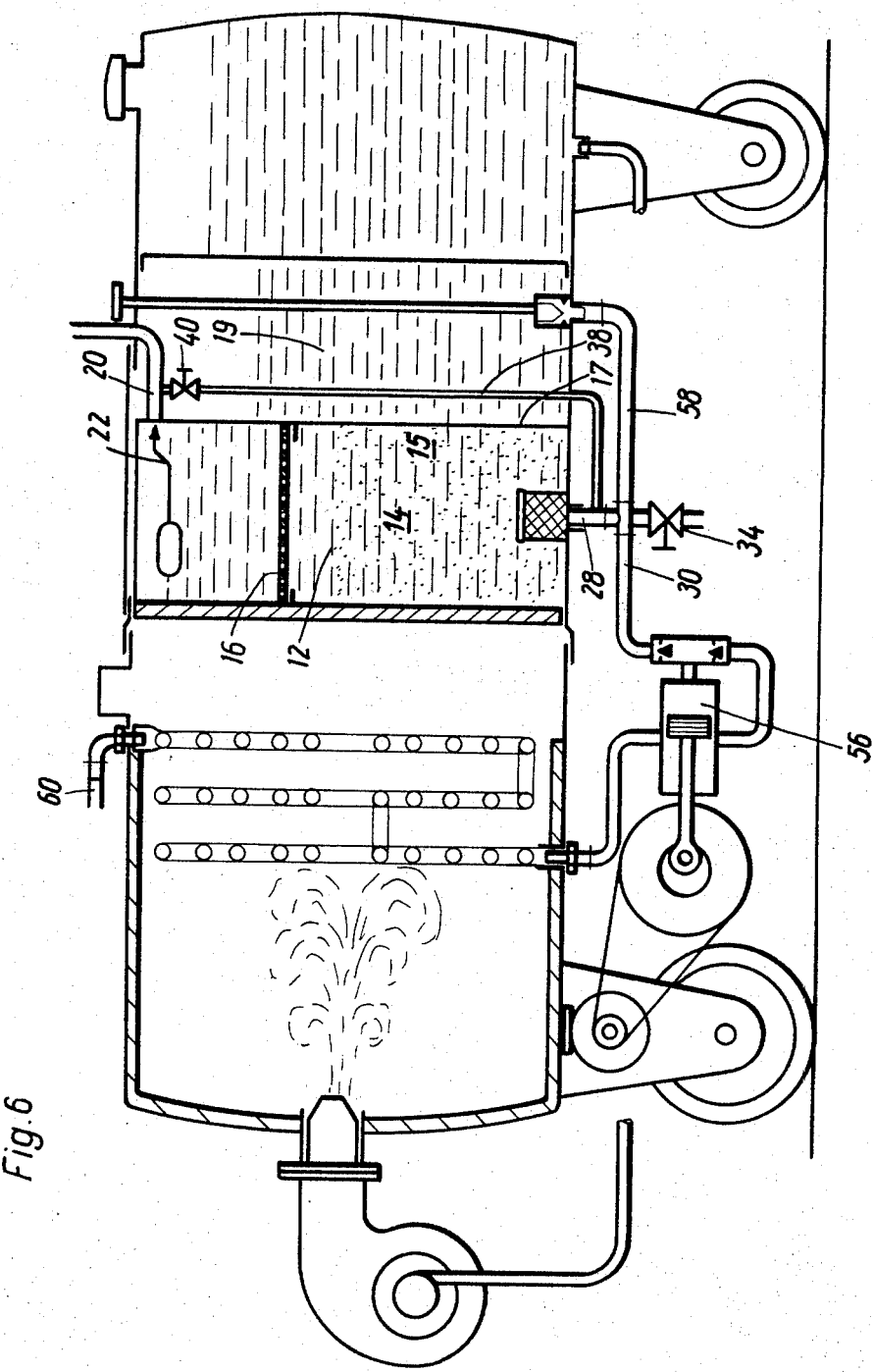
FIG. 6 shows a washing machine similar to FIG. 5 incorporated in a steam jet machine.

As a preferred example of such an arrangement, a steam jet appliance illustrated in FIG. 6 is described below.

This arrangement is based on a steam jet appliance of the type described in German Utility Model Patent No. 1,992,862. This steam jet appliance consists of two casing parts which are detachably connected together and one of which has a combustion chamber with a heating coil and burner, while the other comprises an oil tank, a washing medium tank, and a water supply pipe. The part comprising the combustion chamber and heating coil is unchanged, while the other part of the casing, which retains the oil tank and the washing medium tank, is equipped with a water softening chamber which is connected to the washing medium tank. The unit comprising the washing medium tank and the water softening chamber here corresponds to the tank 15 in FIG. 5, or more specifically the washing medium tank 10 corresponds to the tank 19 and the water softener chamber to the tank 12. Whereas in the case of the washing machine 10 the liquid is drawn by suction out of the tanks 12 and 19 in the upward direction, a piston pump 56 here draws the softened water downwards through a pipe 28 which is provided with a branch. A connecting pipe 58, through which washing solution flows from the tank 19 leads into the pipe 30. The mount of this pipe is provided with a needle valve which controls its cross-section and which can be adjusted by means of a handle (not given a reference). Just as the operation of the water softener/washing solution mixer unit corresponds to that of the unit described in FIG. 5, the observations made in connection with FIG. 5 are also appropriately applicable here, so that repetition at this point is superfluous. The prepared washing medium can be withdrawn through a pipe 60.

The particular advantage of the invention consists in that correspondingly constructed and shaped water softeners of great capacity can be manufactured with simpler means and at lower cost for manufacture and materials as continuously operating appliances, since they work completely without pressure, i.e., solely with the pressure of the column of liquid contained in the tank. The tanks may have thin walls and be made of sheet steel or plastics material, and they merely need to withstand the internal pressure of the volume of water contained in them. All the sealing problems arising with the usual pressure tanks are thus eliminated.

Another advantage is provided by the simplicity of the operation of regeneration and washing or back washing, separate brine tanks and the like not being required.

The assembly comprising the combined water softener and washing solution tank advantageously forms a compact constructional unit which is capable of numerous uses.

The application of the invention enables appliances consuming water to be given a high degree of protection against deposition of harmful substances in the water, which is particularly important in the case of appliances in which the water is heated (heating coil, steam jet appliances, etc.) since longer life and longer intervals between maintenance are ensured.

Another advantage is achieved through the combination of a water softener and washing solution tank in a tank casing through the saving of additional connecting pipes, fittings, and the like, so that in addition to the advantages which can be achieved and the smaller space required, a saving in cost of manufacture is also possible.

I claim:

1. An apparatus for softening water, comprising, in combination:

a first tank which is filled at least partially with an ion exchange composition and which is open at its upper portion;

said tank being provided with inlet means, outlet means, and control means so that with a continuous flow through said tank a constant level of liquid is maintained within said tank;

said inlet means including a branch having a backwash pipe adapted to be closed by a valve;

drain means operatively connected to the lower portion of said tank;

a second tank containing a washing solution;

a common casing for said first mentioned ion exchange tank and said second washing solution tank;

said common tank casing being subdivided by a partition to form said washing solution tank and said ion exchange tank;

a pumping apparatus drawing simultaneously from said first ion exchange tank and said second washing solution tank;

means operable to regulate the quantity and proportion of washing solution to ion exchanged water drawn through said pumping apparatus;

means fluidly isolating said ion exchange tank from said washing solution tank and operable to backwash and regenerate said ion exchange composition;

means selectively operable to drain solvent of ion exchange composition from said first tank into said second tank; and said constant level control means being operable to maintain a level of liquid within said first mentioned tank independent of the level of liquid in said second mentioned tank.

* * * * *